June 10, 1924.

W. S. ELLIOTT

METHOD OF TREATING LIQUIDS AND APPARATUS THEREFOR

Filed Feb. 24, 1922

INVENTOR
William S. Elliott

Patented June 10, 1924.

1,497,491

UNITED STATES PATENT OFFICE.

WILLIAM S. ELLIOTT, OF PITTSBURGH, PENNSYLVANIA.

METHOD OF TREATING LIQUIDS AND APPARATUS THEREFOR.

Application filed February 24, 1922. Serial No. 538,944.

*To all whom it may concern:*

Be it known that I, WILLIAM S. ELLIOTT, a citizen of the United States, residing at Pittsburgh, in the county of Allegheny and State of Pennsylvania, have invented a new and useful Improvement in Methods of Treating Liquids and Apparatus Therefor, of which the following is a full, clear, and exact description, reference being had to the accompanying drawings, forming part of this specification, in which—

Figure 1:
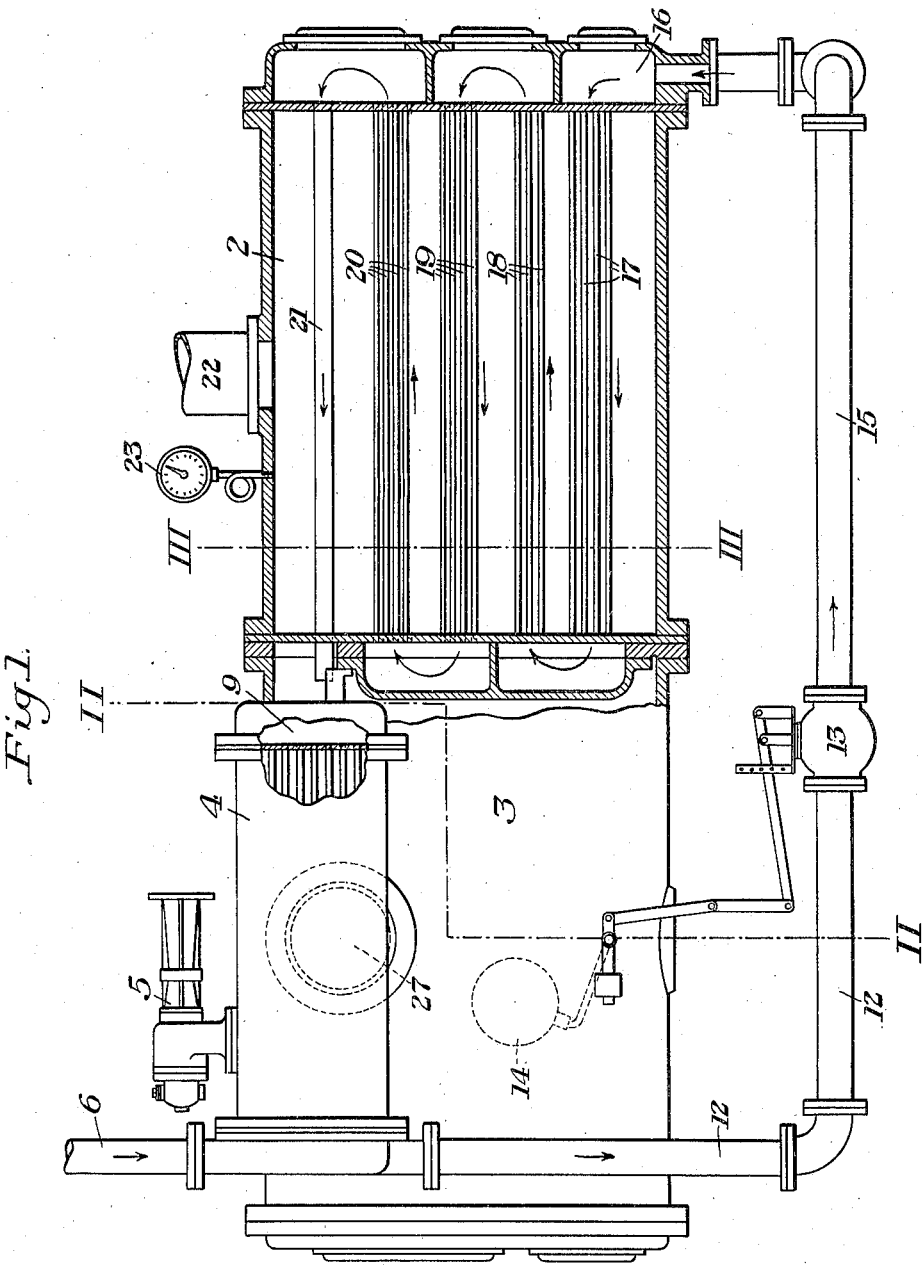
Figure 1 is a diagrammatic side elevation partly in section and partly broken away, illustrating one form of my invention.
Figure 2:
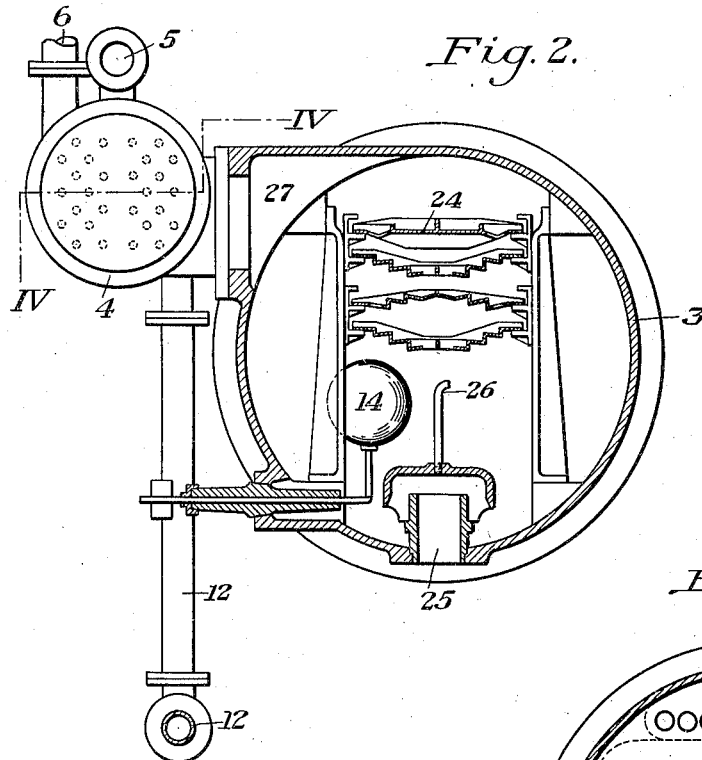
Figure 2 is a sectional view on the line II—II of Figure 1.
Figure 3:
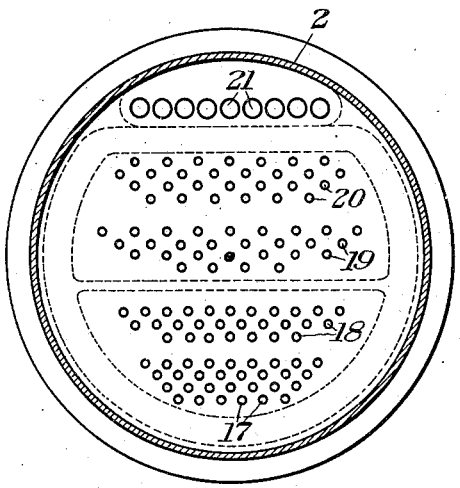
Figure 3 is a sectional view on the line III—III of Figure 1.
Figure 4:
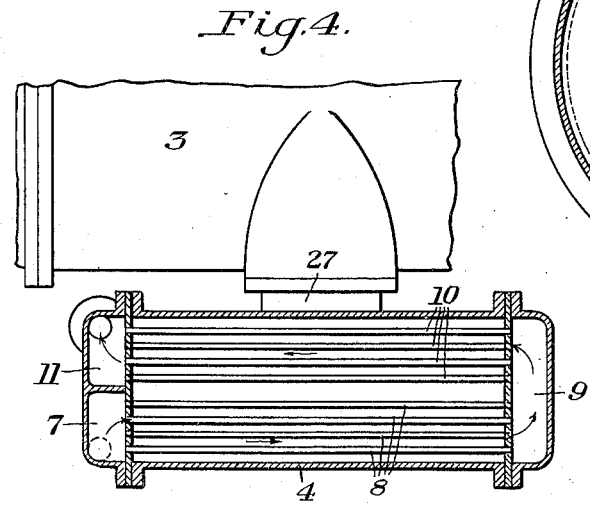
Figure 4 is a detail sectional view on the line IV—IV of Figure 2.

The present invention relates broadly to liquid treating apparatus, and more particularly to a water heating apparatus for effecting removal from the water of the entrained air and gases.

Pipes, and other apparatus, carrying hot water corrode and disintegrate due to the presence of oxygen and other gases in the water. By separating such gases from the water, the corrosion may be reduced in about the same proportion as the corrosive gases are eliminated. Many attempts have been made to remove air and dissolved gases from liquid by a simple boiling process comprising raising the temperature of the water to the boiling point and attempting to drive off all of the gases at this temperature. This process is extremely slow, and can be successful only when the liquid remains in the vessel for a definite period.

In separating gases from liquids there are several important variables which must be taken into consideration. These variables include the amount of dissolved gases contained in the liquid before treatment, the degree of separation required, and the temperature employed for the amount of separation required.

It may be generally stated that the solubility of gases in liquid decreases with the temperature. Therefore, if raw liquid to be treated enters the gas separating apparatus at a low temperature, a greater amount of heat must be employed not only to raise the temperature of the liquid to its boiling point, but to produce a sufficient amount of evaporation to drive off the gases along with the vapors, than is required where the liquids being treated enter the apparatus at high temperature.

I have found from investigation and experimentation that a definite amount of heat must be dissipated at a definite temperature to separate definite quantities of gases originally contained in the liquid, and in order to eliminate the time element and purify a constant liquid supply as it flows through the apparatus, I have found it necessary to not only maintain the boiling point of the liquid, but in addition to supply thereto a sufficient quantity of heat to evaporate a definite percentage of the liquid as it flows from the supply through the apparatus to the point of use.

In accordance with the present invention I admit liquid into a vessel in which a definite pressure is maintained, and provide a sufficient amount of heat to raise the temperature to the boiling point of the liquid at the particular pressure maintained in the vessel. I then supply a further amount of heat sufficient to carry on constant evaporation of the liquid at this pressure, to such an extent that a definite percentage of the liquid passing through the apparatus will be evaporated therein. The invention also contemplates the provision of means for recovering the heat from the vapors and gases released by the heating and evaporating process.

Referring to the drawings, there is illustrated an apparatus comprising essentially a heater 2, an evaporating chamber 3, a condenser 4 and an ejector 5. The different parts of the apparatus may be assembled in any desired manner, and the present drawings are merely illustrative of one embodiment of my invention. In carrying out my invention, the liquid to be treated is supplied through a suitable pipe 6 to the chamber 7 in one end of the condenser 4. This liquid then passes through the pipes 8 to the chamber 9 at the opposite end of the condenser and returns through the pipes 10 to the chamber 11. From the chamber 11 the liquid passes through a pipe 12 to a valve 13. This valve is adapted to be automatically controlled by a suitable float 14 located within the evaporating chamber 3 and operatively connected thereto in any desired manner to open the valve as the liquid level within the evaporating chamber lowers and closes the same as this level rises. From the valve 13 the liquid passes through pipe 15 to the header 16. From this header the liquid flows in a circuitous or tortuous course successively through a series of tubes 17, 18, 19, 20 and 21, each series communicating with suitably arranged headers as is customary in the art. During the passage of the liquid through these series of tubes it is subjected to a source of heat, such as steam, which may be admitted through an inlet 22. In accordance with the present invention sufficient steam is admitted to maintain the liquid at the temperature of its boiling point at the pressure existing within the heater and a further amount of heat is supplied sufficient to effect the evaporation of a definite amount of the liquid and thereby effect the separation of definite quantities of gasses originally contained therein. If desired, a gauge 23 may be provided for indicating the temperature conditions within the heater, and any other desired instruments may be provided as is customary in the art.

In the form of my invention illustrated herein I have shown the last series of tubes 21 as having a slightly greater cross-sectional area than the combined cross-sectional area of all of the tubes of any other single pass. This construction is not necessary, but in some cases it is desirable in order to provide for the evaporation within the heater, and more particularly within the tubes 21 of a definite amount of the liquid passing therethrough.

From the last series of tubes, the liquid at the definite temperature to which it has been raised passes into the evaporating chamber 3 through which it passes over spray pans 24 of any desired construction. Such spray pans break up the liquid into comparatively small streams thereby assisting in the separation of entrained gases therefrom. Liquid having the air and gases removed therefrom may be drawn from the evaporating chamber 3 through the outlet connection 25, this connection being vented in any desired manner as by a vent 26.

In order to conserve heat, and more particularly the heat of the gases and vapors released from the liquid, these vapors are adapted to pass through a suitable connection 27 into the condenser 4 where they give up their heat to the entering liquid. This preliminarily raises the temperature of the liquid so that the amount of heat required in the heater is accordingly decreased. Within the condenser 4 the condensable content of the vapor is condensed, while the non-condensable content may be removed therefrom in any desired manner as by the ejector 5.

It will be understood that changes may be made in the construction and operation of my invention without departing from the spirit thereof or the scope of my broader claims. One modification of this nature that may be made will be in the pressure at which the apparatus is operated. This pressure may vary from any desired degree of vacuum to atmospheric pressure. When atmospheric pressure obtains it will be apparent that the ejector may be eliminated and an ordinary vent utilized.

The advantages of the present invention arise from the means and method herein disclosed for effecting a definite result, viz: the evaporation of a definite amount or percentage of the liquid whereby there is effected the separation of definite quantities of the gases originally contained therein.

I claim:

1. In the method of treating liquid to effect the removal of air therefrom, the steps consisting in maintaining a definite pressure within a heater, admitting the liquid to be treated thereto, supplying a sufficient amount of heat to raise the temperature of the liquid to the boiling point at said pressure and further heat to an amount to change the phase of said liquid to a percentage sufficient to release substantially all the air contained therein.

2. In the method of treating liquid to effect the removal of air therefrom, the steps consisting in maintaining a definite pressure within a heater, admitting the liquid to be treated thereto, supplying a sufficient amount of heat to raise the temperature of the liquid to the boiling point at said pressure and further heat to an amount to change the phase of said liquid to a percentage sufficient to release substantially all the air contained therein, and recovering the heat from the vapors and gases released by such change of phase.

3. In a method of treating liquid, the steps consisting in maintaining a definite pressure within a heater, admitting the liquid to be treated thereto, supplying a sufficient amount of heat to raise the temperature of the liquid to the boiling point at said pressure and a further amount of heat sufficient to insure a substantially constant evaporation of a definite percentage of the liquid at said pressure, and imparting the heat of the released vapors and gases to the liquid to be treated prior to its passage to the heater.

4. In the method of treating liquid to effect the removal of air therefrom, the steps consisting in supplying the liquid to be treated to a suitable apparatus and maintaining therein definite temperature and pressure conditions to effect a change of phase of a definite percentage of all the liquid being treated in the apparatus.

5. In a method of treating liquid to effect the removal of air therefrom, the steps consisting in supplying the liquid to be treated to a suitable apparatus and maintaining therein definite temperature and pressure conditions to effect a change of phase of a definite percentage of all the liquid being treated in the apparatus, to insure the separation therefrom of definite quantities of the gases originally contained in the liquid and effecting the removal of the released gases from the apparatus.

6. In the method of treating liquid to effect the removal of air therefrom, the steps consisting in supplying the liquid to be treated to a suitable apparatus and maintaining therein definite temperature and pressure conditions to effect the evaporation of a definite percentage of all the liquid being treated in the apparatus, and recovering the heat from the vapors and gases released by the heating and evaporating process.

7. In the method of treating liquid to effect the removal of air therefrom, the steps consisting of separating therefrom definite quantities of the gases originally contained therein by supplying a sufficient amount of heat to the liquid being treated to maintain the same at the temperature of the boiling point corresponding with the pressure and a further amount of heat to effect the evaporation of a definite percentage of all the liquid.

8. A method of extracting gases from liquids, which consists in maintaining a definite pressure within a heater, passing therethrough the liquid to be degasified in accordance with demands for air free liquid, supplying a sufficient amount of heat to raise the temperature of the liquid to the boiling point at the pressure in said heater and a further amount of heat to insure a change of phase of the liquid to an extent sufficient to effect the release of substantially all the air contained therein.

9. In the method of treating liquid to effect the removal of air therefrom, the steps consisting of supplying the liquid to be treated to a suitable apparatus, maintaining in such apparatus definite temperature and pressure conditions to effect the evaporation of a definite percentage of the liquid being treated therein, condensing the vapors released by such evaporation, and positively withdrawing the non-condensable gases from the apparatus, 10. In the method of treating liquid to effect the removal of air therefrom, the steps consisting of supplying the liquid to be treated to a suitable apparatus, maintaining in such apparatus definite temperature and pressure conditions to effect the evaporation of a definite percentage of the liquid being treated therein, condensing the vapors released by such evaporation, and releasing the non-condensable gases from the apparatus.

11. In a method of treating liquid to effect the removal of air therefrom, the steps consisting in supplying the liquid to be treated to a suitable apparatus, maintaining therein definite temperature and pressure conditions to raise the temperature of the liquid to the boiling point corresponding to the pressure of the liquid, and an additional amount of heat to evaporate a definite percentage of said liquid, and then agitating said heated liquid under conditions to effect a further separation of air therefrom.

12. In the method of treating liquid, the steps consisting in supplying the liquid to be treated to a suitable apparatus, maintaining therein definite temperature and pressure conditions to raise the temperature of the liquid to the boiling point corresponding to the pressure of the liquid, and then passing the heated liquid out of contact with the source of heat and agitating the same.

In testimony whereof I have hereunto set my hand.

WILLIAM S. ELLIOTT.